(12) United States Patent
Kim et al.

(10) Patent No.: US 7,769,349 B2
(45) Date of Patent: Aug. 3, 2010

(54) APPARATUS AND METHOD FOR STORING AND READING OUT DATA IN A MOBILE TERMINAL

(75) Inventors: Hark-Sang Kim, Daegu (KR);
Do-Hwan Choi, Daegu (KR);
Yeong-Moo Ryu, Gumi-si (KR);
Seok-Hyo Park, Gumi-si (KR);
Young-Moung Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1113 days.

(21) Appl. No.: 11/184,805

(22) Filed: Jul. 20, 2005

(65) Prior Publication Data

US 2006/0019607 A1    Jan. 26, 2006

(30) Foreign Application Priority Data

Jul. 22, 2004    (KR) .................... 10-2004-0057375

(51) Int. Cl.
*H04B 7/00* (2006.01)
*G06F 13/00* (2006.01)
*H04H 40/00* (2008.01)
*H04M 1/00* (2006.01)

(52) U.S. Cl. .................. 455/66.1; 455/3.06; 455/550.1; 711/101

(58) Field of Classification Search ............... 455/186.1, 455/3.06, 66.1, 67.11, 67.14, 74, 418, 420, 455/115.1, 115.2, 566, 90.1, 90.2, 556.1, 455/550.1; 711/101, 115
See application file for complete search history.

(56) References Cited

U.S. PATENT DOCUMENTS 5,357,285 A * 10/1994 Sanya et al. .................. 348/716
7,433,712 B2 * 10/2008 Moran et al. ................. 455/557

FOREIGN PATENT DOCUMENTS

KR        20020078408        10/2002

* cited by examiner

*Primary Examiner*—Eugene Yun
(74) *Attorney, Agent, or Firm*—Roylance, Abrams, Berdo & Goodman, L.L.P.

(57) ABSTRACT

Disclosed is a mobile terminal and in particular a data storing and reading method of a mobile terminal which makes it possible to perform mutual data exchange between a mobile terminal and a personal computer (PC) by using a universal serial bus interface (USB). For this purpose, there is provided a method and apparatus for storing and reading data in a mobile terminal connected with a PC through a USB interface, wherein the method comprises steps of: detecting whether the mobile terminal is powered on and connected with the PC; recognizing the mobile terminal as a portable disc drive if it is detected that the mobile terminal is connected with the PC; at a write mode for storing data after the mobile terminal is recognized as a portable disc drive, storing data in one of a phone memory installed in the mobile terminal and an auxiliary memory according to a preset storing mode; and at a read mode for reading out and transmitting stored data after the mobile terminal is recognized as a portable disc drive, reading out and transmitting corresponding data from the phone memory or the auxiliary memory, that is stored with data desired to be read out.

20 Claims, 7 Drawing Sheets

US 7,769,349 B2

APPARATUS AND METHOD FOR STORING AND READING OUT DATA IN A MOBILE TERMINAL

PRIORITY

This application claims the benefit under 35 U.S.C. 119(a) of an application entitled "Method of Storing and Reading out Data in Mobile Terminal" filed with the Korean Industrial Property Office on Jul. 22, 2004 and assigned Serial No. 2004-57375, the entire contents of which are hereby incorporated by reference.

BACKGROUND OF THE INVENTION

1. Field of the Invention

The present invention relates to a mobile terminal. In particular, the present invention relates to an apparatus and method for storing and reading out data in a mobile terminal, wherein the apparatus and method allow the exchange of data between a mobile terminal and a personal computer (PC), using a universal serial bus (USB) interface.

2. Description of the Related Art

Universal serial buses (USB's) have made it possible to more rapidly and conveniently connect a PC and a peripheral device and to interconnect a larger number of devices. Numerous devices have USB interfaces. For example, almost all devices, such as printers, scanners, external hard discs, MP3 players and digital cameras, support a USB interface.

A mobile phone or a mobile terminal may exchange data with a PC by interconnecting the mobile phone and the PC with a cable using a 24-pin connector, i.e., a USB interface. However, such a PC must be equipped with an application program for exchanging data with a mobile terminal. Therefore, data exchange is executed between the mobile telephone and the PC through the application program under the condition that the mobile terminal and the PC are synchronized.

Accordingly, a conventional mobile phone can exchange data with a PC by being PC-linked with the PC as described above.

For example, a conventional mobile phone and a USB interface of a PC installed with an application program are interconnected by a cable. Thereafter, if the application program installed in the PC is executed, the conventional mobile phone and the PC become synchronized with each other. Then, the monitor of the PC displays data such as names, telephone numbers, e-mail addresses, and so on that are stored in the phone book of the mobile phone, as well as bell melodies, image files (e.g., background screens, photographs, etc.), and electronic diary data such as schedules that are stored in the mobile phone.

Thereafter, a user may enter and/or manipulate the above-mentioned data capable of being stored in the mobile phone through the PC for transmission to the mobile phone using a USB protocol and a cable. Thereby, the data may be stored without requiring the input of telephone numbers, schedules or the like one by one using the limited input means of a conventional mobile phone keypad. In addition, when using the stored data, a corresponding data is read out and displayed in a display window.

However, such a conventional mobile phone has a problem in that because the received data are stored only in one position, i.e., in a memory having a small storage capacity in the mobile phone, only the data desired by the user in the mobile phone is restrictively stored and read out. In addition, there is no other way to store and read out selected data such as a bell melody, image file, and phone book only. Moreover, because the data such as bell melodies, image files or a phone book are restrictively stored, it is presently not possible to execute mutual data exchange using an external PC, whereby a memory of a mobile terminal, which is easy to carry, can be used as a portable disc drive. A need therefore exists for a mobile terminal that can effectively store and exchange data with an external PC and operate as a portable disc drive.

SUMMARY OF THE INVENTION

Accordingly, the present invention has been made to solve the above-mentioned problems occurring in the prior art, and an object of the present invention is to provide an apparatus and method of storing and reading out data in a mobile terminal, wherein the apparatus and method allow mutual data exchange between a mobile terminal and a personal computer (PC) for all kinds of data using a universal serial bus interface (USB).

Another object of the present invention is to provide an apparatus and method of storing and reading out data in a mobile terminal, wherein a mobile terminal connected to a PC through a USB interface is adapted to be recognized as a portable disc drive, so that data can be stored and read out in the mobile terminal.

Another object of the present invention is to provide an apparatus and method of storing and reading data in a mobile terminal, wherein the apparatus and method allow storage data either in a hard disc drive (HDD) or in a phone memory installed within a mobile terminal.

Still another object of the present invention is to provide an apparatus and method of storing and reading out data in a mobile terminal, wherein the apparatus and method increase the data storage capacity of a mobile terminal.

In order to achieve the above-mentioned objects, there is provided an apparatus and method of storing and reading data in a mobile terminal connected with a PC through a USB interface, wherein the apparatus and method comprise detecting whether the mobile terminal is powered on and connected with a PC; recognizing the mobile terminal as a portable disc drive if it is detected that the mobile terminal is connected with the PC; at a write mode for storing data after the mobile terminal is recognized as a portable disc drive, storing data in one of a phone memory installed in the mobile terminal and an auxiliary memory according to a preset storing mode; and at a read mode for reading out and transmitting stored data after the mobile terminal is recognized as a portable disc drive, reading out and transmitting corresponding data from the phone memory or the auxiliary memory, that is stored with data desired to be read out.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements are denoted by the same reference numerals.

DETAILED DESCRIPTION OF EXEMPLARY EMBODIMENTS

Hereinafter, embodiments of the present invention will be described with reference to the accompanying drawings. In the following description, a detailed description of known functions and configurations incorporated herein will be omitted for conciseness.

According to an embodiment, when data communication is made between a mobile terminal having a disc device as an auxiliary memory and a personal computer (PC), the PC recognizes the mobile terminal as a portable disc drive and accesses data from the auxiliary memory or a phone memory.

Figure 1:
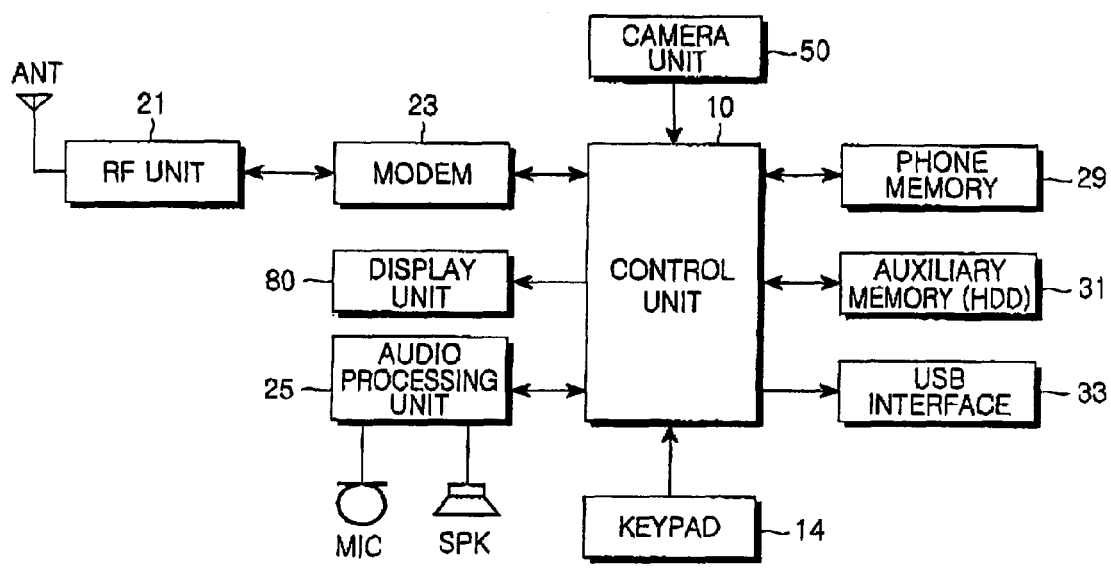
FIG. 1 is a block diagram illustrating a mobile terminal according to an embodiment of the present invention.

FIG. 1 is a block diagram of a mobile phone 20 according to an embodiment of the present invention.

Referring to FIG. 1, a radio frequency (RF) unit 21 performs a communication function for the mobile terminal. The RF unit 21 comprises a RF transmitter (not shown) for amplifying and up-converting the frequency of signals being transmitted, and a RF receiver (not shown) for low-noise amplifying and down-converting the frequency of signals being received.

A modem 23 comprises a transmitter (not shown) for coding and modulating the signals being transmitted and a receiver (not shown) for decoding and demodulating the signals being received. That is, the modem 23 processes and transmits packet data or the like or audio signals such as sounds to a control unit 10.

An audio processing unit 25 receives audio signals output from the modem 23, from the control unit 10, outputs the received audio signals through a speaker SPK after converting the received audio signals into audible sounds, and transmits audio signals input from a microphone MIC to the control unit 10 after converting the audio signals into data.

A keypad 14 comprises a plurality of keys for inputting numerals and characters, and function keys for setting various functions. In addition, the key pad 14 may comprise function keys for executing a write mode and a read mode according to an embodiment of the present invention.

A phone memory 29 may comprise a program memory and a data memory. Programs are stored in the program memory for controlling call processing and general operations of the mobile terminal. According to an embodiment of the present invention, the phone memory 29 is also stored with programs for enabling the mobile terminal to be recognized as a portable disc drive so as to enable data access according to the write and read modes and selective storing of data in an auxiliary memory 31 or the phone memory 29. In addition, the data memory can store call-related data (for example, a phone book) and serve to temporarily store data produced while the programs are being executed. Moreover, the data memory stores data under the control of the control unit 10, either when the data storing is executed in an automatic storing mode or when the phone memory 29 is selected in a manual storing mode.

The auxiliary memory 31 is a memory for supporting the phone memory 29, wherein high capacity data is stored in the auxiliary memory 31. The auxiliary memory 31 may comprise a hard disc drive (HDD). In addition, the auxiliary memory 31 stores multimedia data such as image and music files. Furthermore, when the mobile terminal is recognized as a portable disc drive according to an embodiment of the present invention, the auxiliary memory 31 stores data received at the write mode under the control of the control unit 10.

A USB interface 33, which is a 24-pin connector, allows a charger and a PC connected with a communication cable to be interfaced. The USB interface 33 executes an interface in such a way that the mobile terminal can be recognized as a portable disc drive according to an embodiment of the present invention.

The control unit 10 serves to control the general operations of the mobile terminal. The control unit 10 may comprise a modem 23. The control unit 10 controls the general operations for enabling data to be stored and read out according to a read/write mode through data exchange with a PC which recognizes the mobile terminal as a portable disc drive according to an embodiment of the present invention.

A camera unit 50 comprises a camera sensor for converting an optical signal detected at the time of photographing an image into an electrical signal, and a signal processing unit for converting an analog image signal captured by the camera sensor into digital data. Herein, it is assumed that the camera sensor is a charge coupled device (CCD) sensor, and the signal processing unit can be implemented by a digital signal processor (DSP). In addition, the camera sensor and the signal processing unit can be implemented as an integrated unit or as separate components.

Under the control of the control unit 10, a display unit 80 displays a message generated while executing programs. The display unit 80 also displays an image signal captured in the camera photographing mode as a picture and user data output from the control unit 10. The user data may comprise an icon for indicating whether to set a morning alarm, receiving sensitivity, remaining battery life, and present time. The display unit also indicates the condition of a mobile terminal recognized as a portable disc drive according to an embodiment of the present invention. That, is, the display unit indicates the data transmitting and receiving conditions of the mobile terminal connected to the PC. A liquid crystal display (LCD) may be used with the display unit 80, in which case the display unit may comprise a LCD controller, a memory capable of storing image data, and an LCD display device. If the LCD is implemented in a touch-screen, the key pad 14 and the LCD may serve as input units.

Now, the operation of the mobile phone is described with reference to FIG. 1. If a user performs a dialing operation through the key pad 14 and then sets an outgoing call mode, the control unit 10 detects it, processes the dialed information received through the modem 23, converts the processed information into RF signals and then outputs the RF signals. Thereafter, if the called party produces a response signal, it is detected by the RF unit and the data processing unit. Then, a speech path is formed through the audio processing unit 25, whereby the user can talk via the mobile terminal. At the time of an incoming call mode, the control unit 10 detects, through the modem 23, the incoming call mode and generates a ring signal through the audio processing unit 25. Then, if the user answers, the control unit 10 detects it; consequently a speech path is established through the audio processing unit 25, whereby the user can talk over the established path. Although the outgoing call mode and incoming call mode have been described in terms of voice communication by way of an example, it is also possible to use data communication for communicating packet data and image data. Furthermore, when executing a standby mode or text communication, the control unit 10 displays text data on the display unit 31, wherein the text data is processed through the control unit 10.

In addition, the mobile terminal outputs a figure or surrounding image captured through the camera unit 50 through the display unit 80 after converting the captured image into an electrical signal and converting the electrical signal into digital image data.

Figure 2:
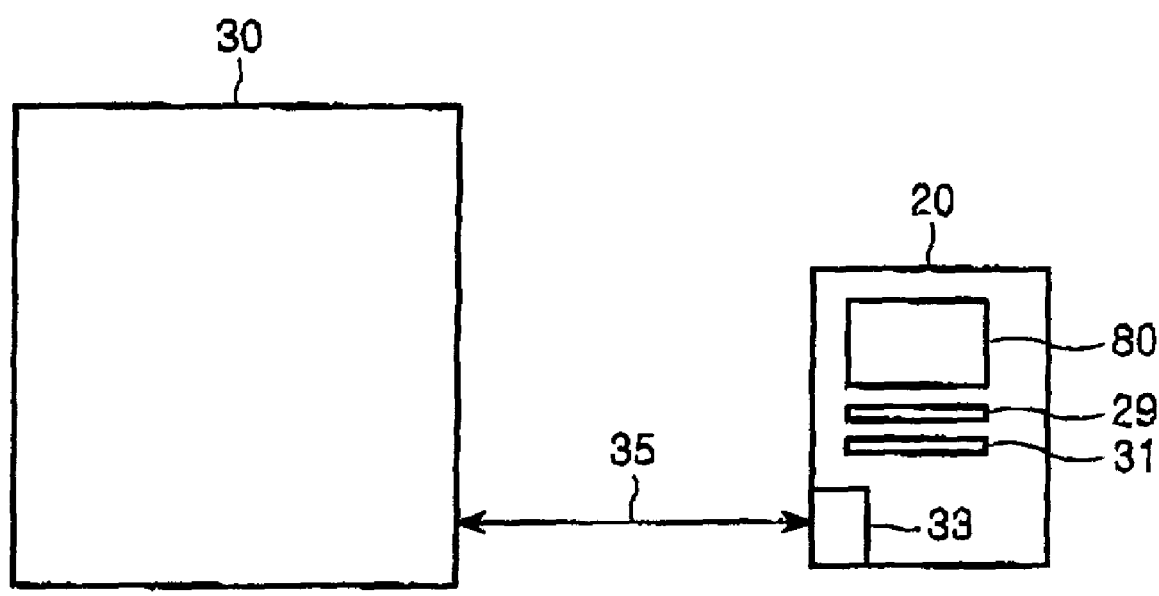
FIG. 2 is a block diagram of a mobile terminal connected to a personal computer according to an embodiment of the present invention.

Now, a description is made as to how the mobile terminal 20 is connected with a personal computer (PC) 30 via a communication cable 35 and operated as a portable disc drive according to an embodiment of the present invention as shown in FIG. 2.

At first, the USB interface 33 of the mobile terminal and the USB interface of the PC are interconnected via a communication cable 35. Then, the PC recognizes the mobile terminal as a new hardware, i.e., as a portable disc drive. In addition, if a USB plug of the communication cable is built into the mobile terminal, data exchange can be executed between the mobile terminal and the PC without any communication cable e.g., a direct connection. In this event, a service is provided to selectively use a communication interrupt mode for the purpose of smooth data exchange between the PC and the mobile terminal recognized as the portable disc drive. It should be appreciated by those skilled in the art that the interface of the PC 30 can be an opposite USB gender of the USB interface 31 to allow a direct connection. The interface of the PC 30 can also be a serial to USB interface without departing from the scope of the present invention.

Thereafter, the control unit 10 performs the following operations according to data input through the USB interface 33:

i) at the read mode, the control unit 10 indicates, on the display unit 80, that it is in the read mode, reads out data, which is desired to be transmitted to the PC 30, selectively from the phone memory 29 or the auxiliary memory 31, and transmits the data read out thereby to the USB interface 33; and ii) at the write mode, the control unit 10 indicates, on the display unit 80, that it is in the write mode, and stores data, which is transmitted from the PC through the USB interface 33, selectively in the phone memory 29 or the auxiliary memory 31.

Figure 3:
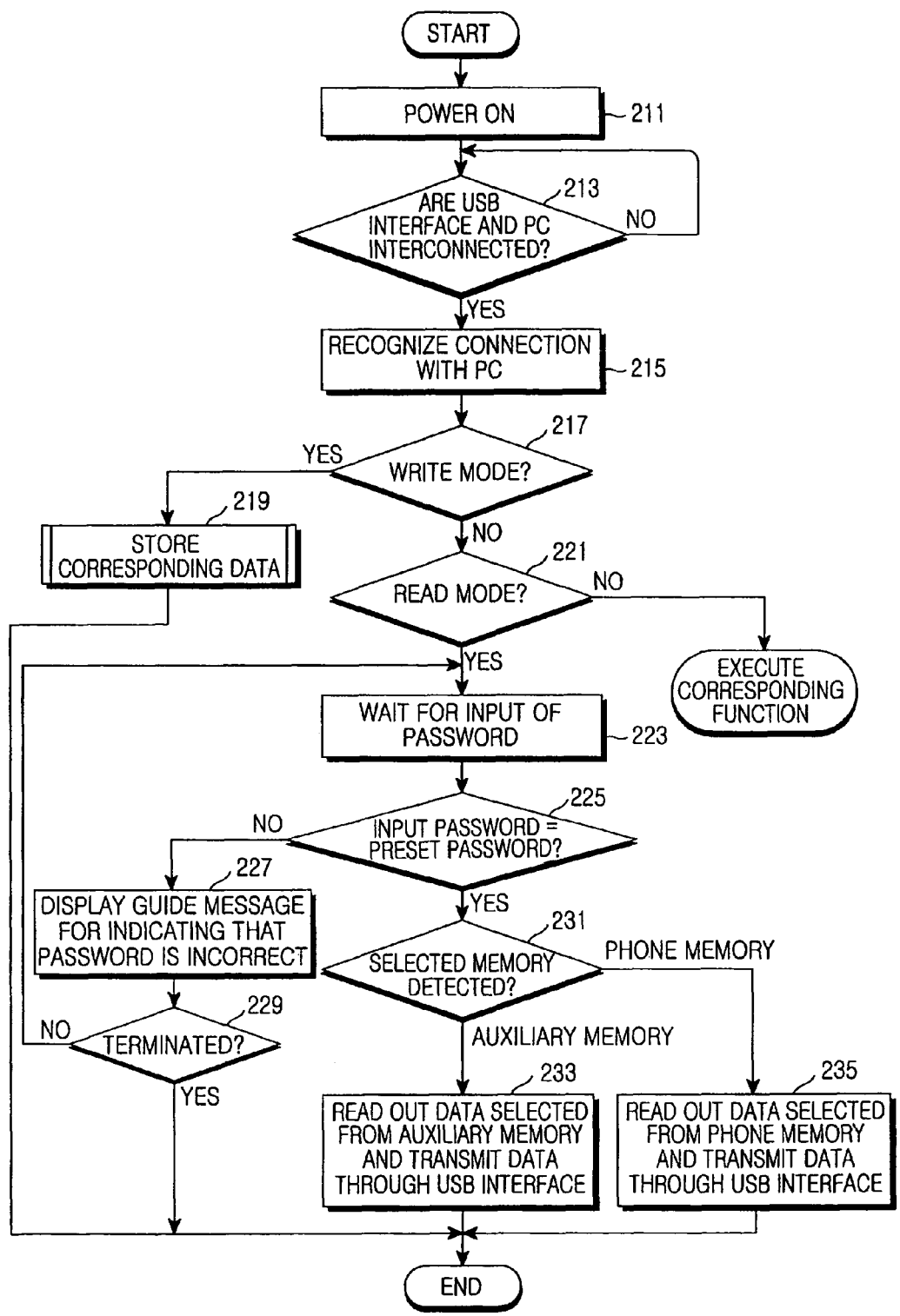
FIG. 3 is a flowchart illustrating a method of storing and reading out data in a mobile terminal according to an embodiment of the present invention.

FIG. 3 is a flowchart illustrating a method of storing and reading data in the mobile terminal according to an embodiment of the present invention.

Referring to FIG. 3, the control unit 10 executes a general initializing operation for the mobile terminal when power is supplied in step 211 and then proceeds to step 213 after entering the standby mode for waiting for key input or call incoming.

Figure 4A:
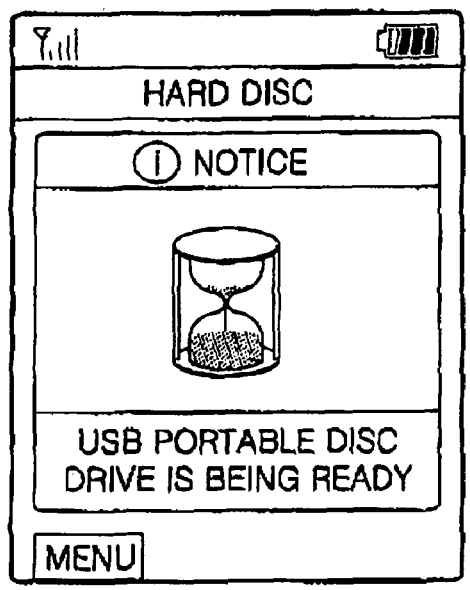
FIGS. 4A to 4F are views for describing a portable disc drive of a mobile terminal according to an embodiment of the present invention.

The control unit 10 detects whether the USB interface 33 and the PC are interconnected in step 213, and if it is detected that the USB interface 33 and the PC are interconnected, the control unit 10 proceeds to step 215 to recognize the interconnection. In that case, the PC recognizes the mobile terminal as a portable disc drive. Then, the control unit 10 displays a guide message, "USB portable disc drive is preparing," on the display unit 80, as shown in FIG. 4A.

Thereafter, the control unit 10 determines whether it is in the write mode for selectively storing data in the phone memory 29 or the auxiliary memory 31 in step 217.

If it is determined that the mobile terminal is in the write mode, the control unit stores the corresponding data in the phone memory 29 or the auxiliary memory 31 in step 219. The specific procedures for the write mode will be described later.

Figure 4B:
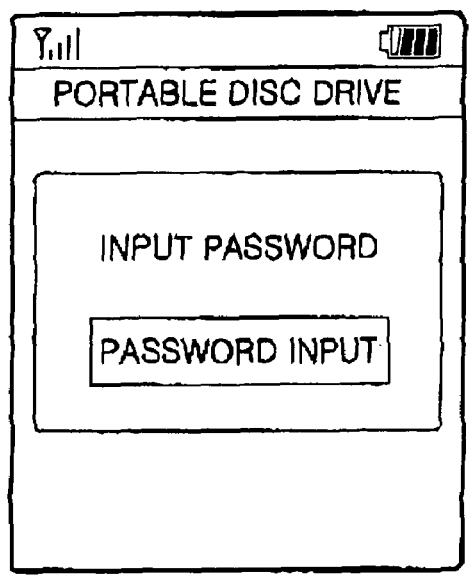

Whereas, if it is determined that the mobile terminal is not in the write mode, the control unit 10 determines whether the mobile terminal is in the read mode in step 221. If it is determined that the mobile terminal is in the read mode, the control unit 10 displays a guide message, "input password," on the display unit 80 and enters a password input standby mode. That is, a window for inputting a password is displayed on the display unit 80 along with the guide message, "input password," as shown in FIG. 4B.

Then, the user inputs a password that matches the preset password, using numerical keys provided in the keypad 14 in step 223. By making it necessary to input a password before the read mode is executed, the data stored in the phone memory 29 and the auxiliary memory 31 can be protected in terms of security and privacy.

The control unit 10 determines whether the input password matches the preset password in step 225. If the passwords do not match, the control unit displays a guide message for indicating that the password is incorrect on the display unit 80 in step 227.

Then, the control unit 10 determines whether the terminating key is input for terminating the read mode in step 229, and if the read mode is terminated, the control unit terminates the use of the portable disc drive function.

However, if it is determined that the read mode is not terminated, the control unit 10 returns to step 223 and waits for the input of a password and displays a guide message, "input password," on the display unit 80. Then, the user inputs again a password matching the preset password.

As a result, if it is determined that the input password matches the preset password in step 225, the user is allowed to select a memory desired to read out data through the read mode.

The control unit 10 proceeds to step 231 and detects whether the memory selected by the user is the phone memory 29 or the auxiliary memory 31. If the selected memory is the auxiliary memory 31, the control unit 10 reads out data selected from the auxiliary memory and transmits the data to the PC through the USB interface 33. The data transmission is executed on the basis of a USB protocol; the detailed technique of such data transmission is well known in the art and a description thereof is omitted.

Whereas, if the memory detected in step 231 is the phone memory 29, the selected data is read out from the phone memory 29 and transmitted to the PC through the USB interface.

Therefore, the PC receives and stores the data stored in either the phone memory 29 or the auxiliary memory 31 of the mobile terminal.

Now, the write mode is specifically described in terms of the procedure for storing corresponding data in step 219.

Figure 5:
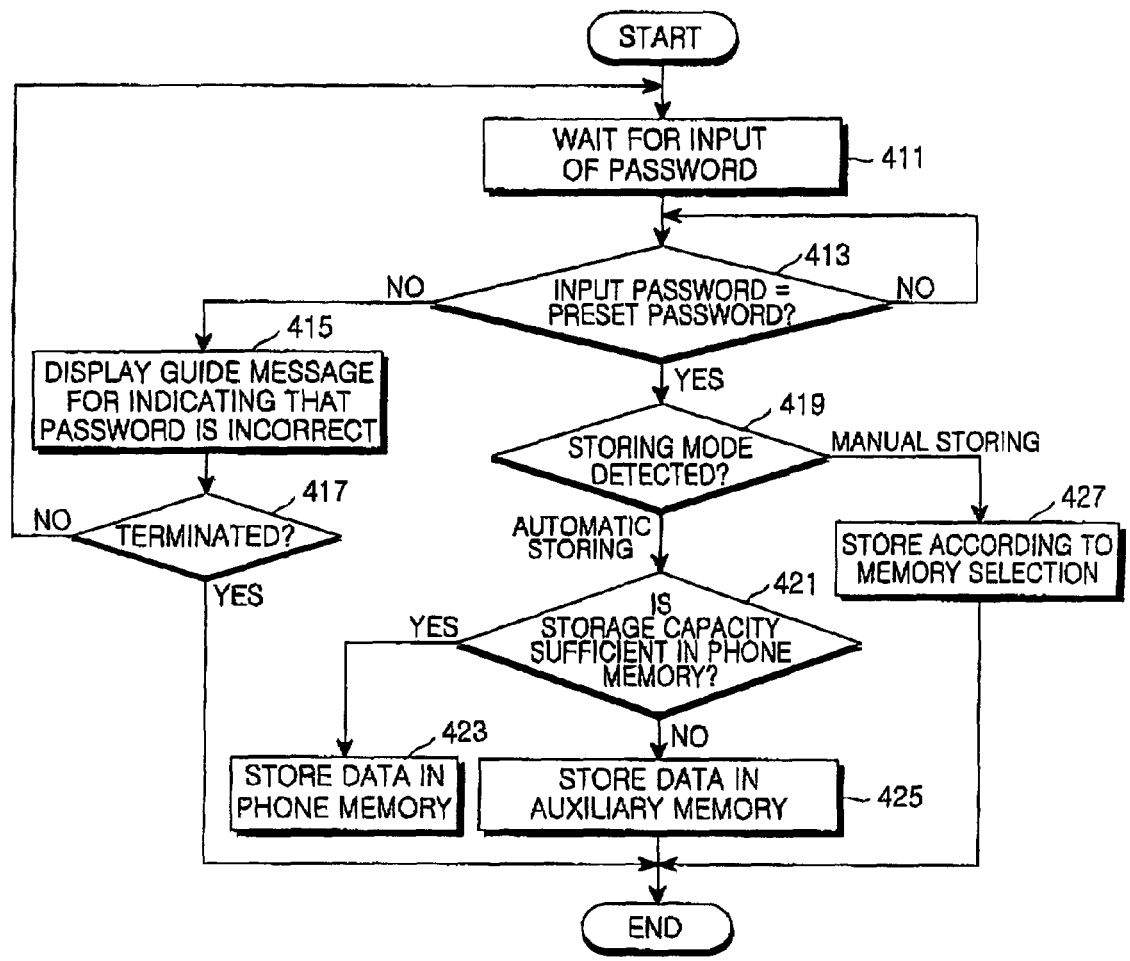
FIG. 5 is a flowchart illustrating a step of storing data at a write mode.

FIG. 5 is a flowchart illustrating the procedure for storing data at the write mode in FIG. 3.

Referring to FIG. 5, the control unit displays a guide message, "input password," on the display unit 80 and enters a password input standby mode, in step 411. At this time, a window for inputting password is displayed on the display unit 80 along with the guide message, "input password," as shown in FIG. 4B, as in the read mode described above. Then, the user inputs a password matching with that preset by the user using the numerical keys provided in the keypad 14. By making it necessary to input a password before executing the write mode, only the user knowing the preset password can store data in the phone memory 29 or the auxiliary memory 31.

The control unit 10 determines whether the input password matches the preset password, in step 413. If it is determined that the input password does not match with the preset password, the control unit 10 displays a guide message, "password is incorrect," on the display unit 80, in step 415.

Then, the control unit 10 determines whether the termination key is input to terminate the write mode and if it is determined that the write mode is terminated, the control unit 10 terminates the use of the portable disc drive function, in step 417.

If the write mode is not terminated, the control unit 10 returns to step 411 to wait for input of a password and displays a guide message, "input password," on the display unit 80. Then, the user inputs again a password matching with the preset password through the keypad 14.

Figure 4C:
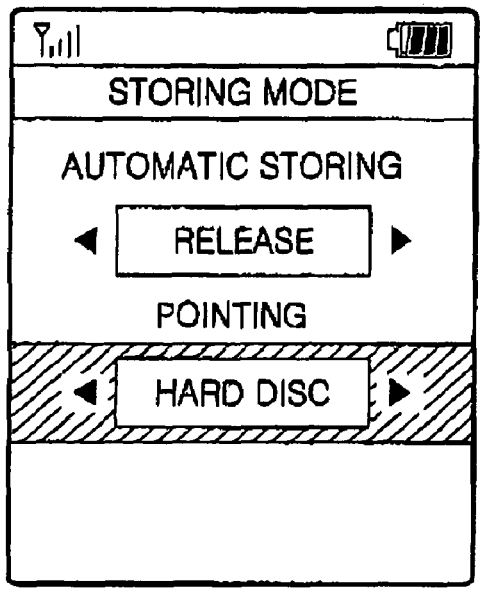
Figure 4D:
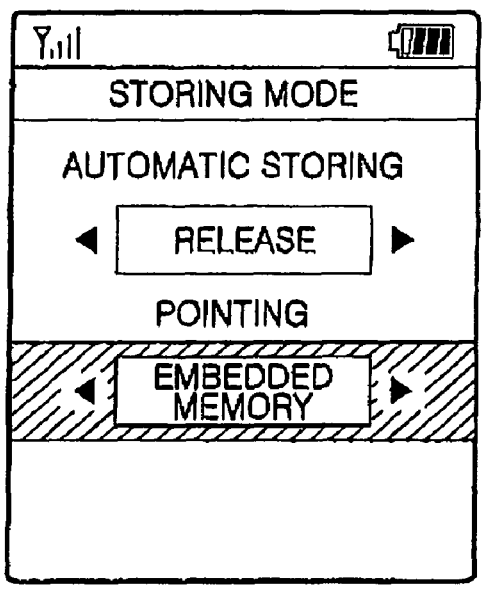

If it is determined that the input password matches with the preset password in step 413, the control unit 10 detects the storing mode preset by the user in step 419. Since the storing mode is preset before the write mode is executed, a default environment is set as one of automatic storing and manual storing modes for storing data in the phone memory 29 or the auxiliary memory 31 through the write mode. The automatic storing mode first tries to store data in the phone memory 29, and the manual storing mode is provided in order for the user to be capable of selecting a position for storing received data, that is, one of the phone memory 29 and the auxiliary memory 31. For example, it is possible to release the automatic storing mode and set an appointed location as "hard disc," which is the auxiliary memory, as shown in FIG. 4C. It is also possible to release the automatic storing mode and to set the appointed location as an "embedded memory," which is the phone memory. If it is desired to change the storing mode from that shown in FIG. 4C to that shown in FIG. 4D or vice versa, it is possible to designate a storing position (the embedded memory or the hard disc) by moving a cursor to a location appointment menu using directional keys provided in the key pad 14 and inputting a "◀"key or a "▶" key from among the directional keys. In addition, if it is desired to change the storing mode from the automatic storing mode to the manual storing mode or vice versa, it is possible to release or set the automatic storing mode by moving the cursor to the corresponding position and inputting the "◀"key or the "▶" key from among the directional keys.

In step 419, if it is detected that the storing mode is the automatic storing mode, the control unit 10 first checks whether the phone memory 29 has a sufficient storage capacity, in step 421. That is, the control unit 10 compares the capacity of data selected to be stored through the write mode and the capacity of the space remaining in the phone memory 29. If it is determined that there is sufficient storage capacity in the phone memory 29 in step 423, the control unit 10 stores the corresponding data in the phone memory 29.

However, if the available capacity remaining in the phone memory is smaller than that of the data to be stored, the control unit 10 stores the data in the auxiliary memory 31 in step 425.

The control unit 10 stores the data in one of the phone memory 29 and the auxiliary memory 31 according to the selection of a storing position among the memories, in step 427.

Figure 4E:
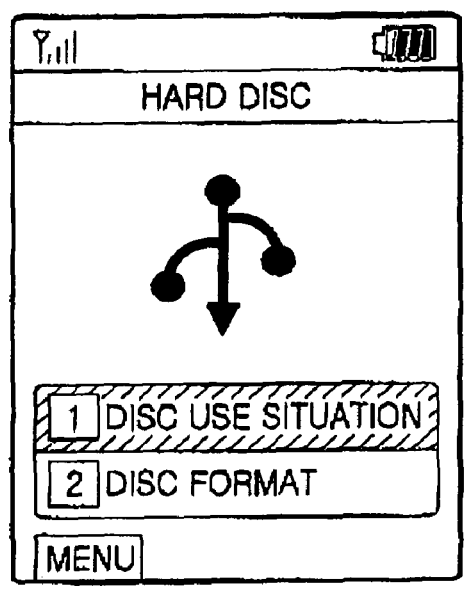
Figure 4F:
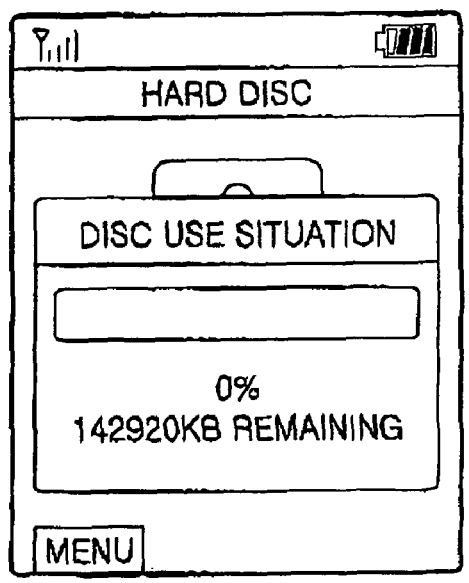

In addition, the inventive mobile terminal displays the stored data and remaining memory capacity of the phone memory 29 so that the data in the phone memory 29 can be managed and also displays the list of data stored in the auxiliary memory 31 so that the data in the auxiliary memory 31 can be managed. Further, as shown in FIG. 4E, the mobile terminal provides a disc usage status menu for indicating how much capacity remains in the hard disc and a disc format menu for allowing disc-formatting. If the disc utilization menu is selected, the capacity of data stored in the hard disc is displayed in percentage (%) and graphical bar scale in terms of total capacity of the hard disc and the remaining capacity (KB) is also displayed, as shown in FIG. 4F. FIG. 4F shows that no data is stored in the hard disc by the indication of "0%" and the available capacity on the hard disc is "1429120 KB."

As described above, an embodiment of the present invention has an effect of allowing mutual data exchange between a mobile terminal and a PC without any limitations on data by using a USB interface. In addition, because it is possible to conveniently transmit data through a mobile terminal that is easily carried by the user by rendering a memory of the mobile terminal to be capable of being recognized as a portable disc drive, the user does not need to use or carry a separate portable disc drive, thereby increasing the user's convenience. Further, because a hard disc is built into a mobile terminal as an auxiliary memory for storing a large amount of data, it is possible to remove inconvenience due to the user having to frequently manage data by deleting unnecessary data in the event the mobile terminal has a small memory capacity.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method of storing and reading data in a mobile terminal connected with a personal computer (PC) through a universal serial bus (USB) interface, the method comprising the steps of:
   providing a phone memory with a program memory which enables the mobile terminal to be recognized as a portable disc drive and enables data access according to a read mode and a write mode to selectively store data in one of an auxiliary memory and the phone memory;
   detecting whether the mobile terminal is powered on and connected with the PC;
   recognizing the mobile terminal as a portable disc drive if it is detected that the mobile terminal is connected with the PC;
   at the write mode for storing data after the mobile terminal is recognized as a portable disc drive, storing data in one of the phone memory installed in the mobile terminal and the auxiliary memory according to a preset storing mode; and
   at the read mode for reading out and transmitting stored data after the mobile terminal is recognized as a portable disc drive, reading out and transmitting corresponding data from the phone memory or the auxiliary memory, which is stored with data desired to be read out.

2. The method as claimed in claim 1, wherein the step of storing data comprises the steps of:
   determining whether the preset storing mode is an automatic storing mode, and storing the data in the phone memory if it is determined that the preset storing mode is the automatic storing mode; and
   recognizing the preset storing mode as a manual storing mode and storing data in one of the phone memory and the auxiliary memory according to a selected memory position, if it is determined that the preset storing mode is not the automatic storing mode.

3. The method as claimed in claim 1, wherein the step of storing data comprises the steps of:
   determining whether a storage capacity is sufficient in the phone memory, and storing data in the phone memory if it is determined that the storage capacity is sufficient; and storing data in the auxiliary memory if it is determined that the storage capacity is insufficient.

4. The method as claimed in claim 3, wherein the storage capacity of the phone memory is compared with a capacity of data to be stored in the phone memory in order to determine whether the storage capacity of the phone memory is sufficient or not.

5. The method as claimed in claim 1, wherein the step of storing data comprises the steps of:
   waiting for input of a password; and
   storing data through the write mode if the input password matches a preset password.

6. The method as claimed in claim 5, further comprising the step of continuously waiting for the input of a password until the read mode is terminated if the input password does not match with the preset password.

7. The method as claimed in claim 5, further comprising the step of displaying a guide message for indicating that the input password is incorrect if the input password does not match with the preset password.

8. The method as claimed in claim 1, wherein the step of reading out and transmitting corresponding data comprises the steps of:
   waiting for input of a password; and
   reading out data through a read mode and transmitting the data to the PC if the input password matches with the preset password.

9. The method as claimed in claim 8, further comprising the step of continuously waiting for input of a password until the write mode is terminated if the input password does not match the preset password.

10. The method as claimed in claim 1, wherein the auxiliary memory is a hard disc drive (HDD).

11. The method as claimed in claim 1, further comprising the steps of providing a disc usage status menu for indicating how much memory capacity remains in the auxiliary memory; and providing a disc format menu for allowing disc formatting.

12. The method as claimed in claim 11, wherein the disc usage status menu displays the stored data in percentage (%) and graphic of bar scale in terms of the total capacity of the auxiliary memory, and the remaining memory capacity (KB).

13. The method as claimed in claim 1, wherein the step of storing data comprises the step of selecting and setting one of automatic storing and manual storing modes as the storing mode before the write mode is executed.

14. The method as claimed in claim 1, further comprising the step of setting one of the phone memory and the auxiliary memory in a default environment if the storing mode is not preset before the step of storing data.

15. An apparatus for storing and reading data in a mobile terminal comprising:
   an input device for entering commands;
   a display device for displaying a status of the mobile terminal;
   a phone memory and an auxiliary memory for storing data; and
   a controller for placing the mobile terminal in a read mode in which the data stored in the phone memory or the auxiliary memory are provided to the PC or a write mode in which the data transmitted by the PC are stored in the phone memory or the auxiliary memory and transferring or receiving data from a personal computer via a universal serial bus (USB) interface;
   wherein the phone memory comprises a program memory which enables the mobile terminal to be recognized as a portable disc drive and data access according to the read and write modes to selectively store data in one of the auxiliary memory and the phone memory; and
   wherein the controller detects whether the mobile terminal is powered on and connected with the PC via the universal serial bus interface and recognizes, by the PC, the mobile terminal as a portable disc drive if it is detected that the mobile terminal is powered on and connected with the PC via the universal serial bus interface.

16. The apparatus as claimed in claim 15 for storing and reading data in a mobile terminal, wherein the controller requires a password from a user prior to providing data from the phone memory and the auxiliary memory.

17. The apparatus as claimed in claim 15 for storing and reading data in a mobile terminal, wherein the auxiliary memory comprises a hard disc drive.

18. The apparatus as claimed in claim 15 for storing and reading data in a mobile terminal, wherein a user selects between reading and writing from either the phone memory or the auxiliary memory.

19. The apparatus as claimed in claim 15 for storing and reading data in a mobile terminal, wherein the mobile terminal and the personal computer are connected via an interface cable.

20. An apparatus for storing and reading data in a mobile terminal connected with a personal computer (PC) through a universal serial bus (USB) interface, comprising:
   a phone memory with a program memory which enables the mobile terminal to be recognized as a portable disc drive and enables data access according to a read mode and a write mode to selectively store data in one of an auxiliary memory and the phone memory;
   wherein the apparatus detects whether the mobile terminal is powered on and connected with the PC;
   wherein the apparatus recognizes the mobile terminal as a portable disc drive if it is detected that the mobile terminal is connected with the PC;
   wherein at the write mode for storing data after the mobile terminal is recognized as a portable disc drive, data is stored in one of the phone memory installed in the mobile terminal and the auxiliary memory according to a preset storing mode; and
   wherein at the read mode for reading out and transmitting stored data after the mobile terminal is recognized as a portable disc drive, the apparatus reads out and transmits corresponding data from the phone memory or the auxiliary memory, which is stored with data desired to be read out.

* * * * *